(12) United States Patent
Ludewig et al.

(10) Patent No.: US 10,279,983 B2
(45) Date of Patent: May 7, 2019

(54) CARRYING CASE FOR HAND HELD OBJECTS

(71) Applicants: Jason W. Ludewig, DeKalb, IL (US); Ronald G. Axon, Rockton, IL (US); Michael K. Basak, Belvidere, IL (US)

(72) Inventors: Jason W. Ludewig, DeKalb, IL (US); Ronald G. Axon, Rockton, IL (US); Michael K. Basak, Belvidere, IL (US)

(73) Assignee: J.L. Clark, Inc., Rockford, IL (US)

( * ) Notice: Subject to any disclaimer, the term of this patent is extended or adjusted under 35 U.S.C. 154(b) by 61 days.

(21) Appl. No.: 15/240,782

(22) Filed: Aug. 18, 2016

(65) Prior Publication Data

US 2017/0050798 A1    Feb. 23, 2017

Related U.S. Application Data

(60) Provisional application No. 62/206,392, filed on Aug. 18, 2015.

(51) Int. Cl.
| | |
|---|---|
| *H02J 7/00* | (2006.01) |
| *A24F 47/00* | (2006.01) |
| *B65D 25/04* | (2006.01) |
| *B65D 43/12* | (2006.01) |
| *B65D 43/16* | (2006.01) |
| *B65D 85/00* | (2006.01) |

(52) U.S. Cl.
CPC ............ *B65D 85/54* (2013.01); *A24F 47/002* (2013.01); *B65D 25/04* (2013.01); *B65D 43/12* (2013.01); *B65D 43/16* (2013.01); *H02J 7/0042* (2013.01)

(58) Field of Classification Search
CPC ........ B65D 85/54; B65D 25/04; B65D 43/12; B65D 43/16; A24F 47/002; H02J 7/0042
USPC ............... 206/236, 242, 256, 265, 540, 235; 220/345.4, 345.5, 522, 521, 254.9
See application file for complete search history.

(56) References Cited

U.S. PATENT DOCUMENTS

| | | | | |
|---|---|---|---|---|
| 1,866,162 | A | * | 7/1932 | Hall ....................... A45D 33/26 132/294 |
| 2,506,600 | A | * | 5/1950 | Kassovic ................ A24F 15/12 131/241 |
| 4,214,658 | A | * | 7/1980 | Crow ...................... A24F 23/04 206/236 |
| 4,223,687 | A | * | 9/1980 | Sandeen ................... A24F 3/00 131/180 |

(Continued)

*Primary Examiner* — Chun Hoi Cheung
(74) *Attorney, Agent, or Firm* — Reinhart Boerner Van Deuren P.C.

(57) ABSTRACT

A carrying case for hand held product is provided that allows access to the hand held object for use without complete removal of the object. One carrying case includes a bottom, a cover and a door. The bottom includes a cavity for housing an assembled object, such as an e-cigarette. The bottom defines a first opening through which the object may be removed from the cavity having a first dimension that is greater than a largest dimension of the object. The bottom includes a second opening having a second dimension that is greater than a smaller dimension of the object that is smaller than the largest dimension and is smaller than the first dimension of the object. The cover is movable between an open state in which access is provided and a closed state. The door is movable between an open state in which access provided and a closed state.

6 Claims, 13 Drawing Sheets

(56) References Cited

U.S. PATENT DOCUMENTS

| | | | | |
|---|---|---|---|---|
| 4,850,481 | A * | 7/1989 | Chern | A24F 15/18 |
| | | | | 206/249 |
| 5,465,738 | A * | 11/1995 | Rowland | A24F 23/04 |
| | | | | 131/180 |
| 5,848,596 | A * | 12/1998 | Zelenik | A24F 23/04 |
| | | | | 131/180 |
| 6,736,261 | B1 * | 5/2004 | Thomas | B65D 5/5213 |
| | | | | 206/236 |
| 7,823,731 | B2 * | 11/2010 | Wu | B65D 85/1009 |
| | | | | 206/236 |
| D703,374 | S * | 4/2014 | Brannon | D27/189 |
| 9,089,166 | B1 * | 7/2015 | Scatterday | A24F 15/12 |
| 2007/0246382 | A1 * | 10/2007 | He | A24F 15/14 |
| | | | | 206/250 |
| 2011/0226773 | A1 * | 9/2011 | Rundberg | A45D 33/006 |
| | | | | 220/345.1 |
| 2013/0037545 | A1 * | 2/2013 | Valley, III | B65D 43/20 |
| | | | | 220/345.2 |

* cited by examiner

CARRYING CASE FOR HAND HELD OBJECTS

CROSS-REFERENCE TO RELATED PATENT APPLICATIONS

This patent application claims the benefit of U.S. Provisional Patent Application No. 62/206,392, filed Aug. 18, 2015, the entire teachings and disclosure of which are incorporated herein by reference thereto.

FIELD OF THE INVENTION

This invention generally relates to carrying cases for hand held objects and particularly elongated objects and particularly hand held cylindrical objects.

BACKGROUND OF THE INVENTION

It is desired to carry many elongated objects such as pens and oral vaporizers in carrying cases such that components thereof are not lost or are kept in an organized manner. Oral vaporizers such as e-cigarettes and oral personal vaporizers have numerous components for operation (oral vaporizers will be referred to generically herein as "e-cigarettes").

For example, e-cigarettes have multiple components for use including a cartomizer and a battery. Often, a user of an e-cigarette will have a second cartomizer as well as a charger for recharging the battery. Unfortunately, with all of these components, it is undesirable to carry the components separately. Additionally, it is desirable to be able to quickly access and use the component stored within the carrying case. Further, sometimes it is desired to access the device for use without the risk of losing additional components stored within the carrying case.

The present invention relates to improvements in the art for containers for carrying one or more components of e-cigarettes and provides improvements over the art.

BRIEF SUMMARY OF THE INVENTION

Embodiments of the invention relate to new and improved carrying cases and particularly new and improved carrying cases for elongated objects and more particularly elongated cylindrical objects. Even more preferably, embodiments of the invention relate to new and improved carrying cases for personal oral vaporizing devices such as e-cigarettes. In one embodiment, the carrying case is configured to allow access to the e-cigarette for vaping without requiring complete removal of the e-cigarette from the carrying case.

In a particular embodiment a carrying case for an elongated object including a bottom, a cover and a door is provided. The bottom includes an internal cavity in which the elongated object may be housed. The bottom defines a first opening through which the elongated object may be removed from the internal cavity. The first opening has a first dimension that is greater than a largest dimension of the elongated object. The bottom includes a second opening having a second dimension that is greater than a smaller dimension of the elongated object that is smaller than the largest dimension. The second dimension being smaller than the first dimension. The cover is movably connected to the bottom to be moved between an open state in which removal of the elongated object through the first opening is provided and a closed state preventing removal of the elongated object. The door is movably connected to the bottom to be moved between an open state in which removal of the elongated object through the second opening is provided and a closed state preventing removal of the elongated object.

In some embodiments, when the cover is in the open state, all components within the carrying case may be removed while when the door is open less than all of the components may be removed.

This second opening allows for quick removal and re-insertion of the object without opening the cover. This also may allow for one hand operation/access to the contents within the internal cavity of the carrying case.

In one embodiment, the door is hingedly connected to the bottom.

In one embodiment, the door is slidably connected to the bottom.

In one embodiment, the cover is slidably connected to the bottom.

In one embodiment, the cover is pivotably connected to the bottom.

In one embodiment, the internal cavity is divided into multiple cavities sized and shaped to correspond to multiple components including a charger and a fully assembled e-cigarette. The second opening directly communicating with the cavity sized and shaped to correspond to the fully assembled e-cigarette.

In one embodiment, the internal cavity includes a cavity section sized and shaped to hold an assembled e-cigarette. The second opening communicating the cavity with the exterior of the carrying case when the door is in the open state such that a user can use the e-cigarette without fully removing the e-cigarette from the internal cavity.

In one embodiment, the cover includes an outer shell connected to an attachment insert. In a more particular embodiment, means for connecting the attachment insert to the bottom and to permit sliding action between the attachment insert and the bottom is provided.

In one embodiment, the cover includes an attachment portion and a shell portion, the shell portion is operably connected to the attachment portion and the attachment portion slidably connects the cover to the bottom.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
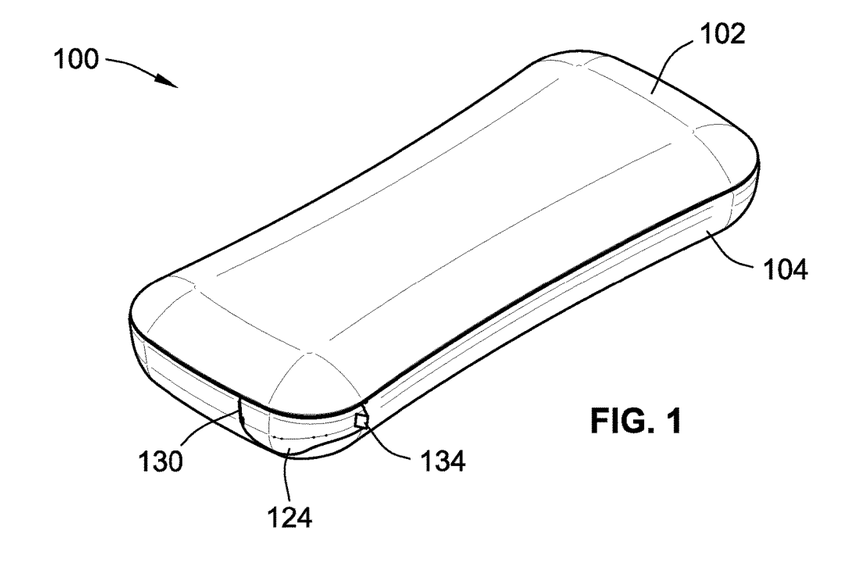
FIG. 1 is a top perspective view of a carrying case according to an embodiment of the present invention in a closed state.

FIG. 1 illustrates an embodiment of a carrying case 100 for storing and carrying elongated objects and components thereof. The embodiments herein will be described in conjunction with e-cigarettes and the components of an e-cigarette. However, the carrying case(s) could find use for carrying other objects such as, for example, pens.

The carrying case 100 generally includes a cover 102 and a bottom 104. The cover 102 and bottom 104 are designed to slide relative to one another to provide access to an internal cavity 106 that holds the components of the e-cigarette, as illustrated in FIG. 2.

The cover 102 and bottom 104 may be formed of various different materials such as plastic and metal and particularly molded plastic or sheet metal. In some embodiments, the carrying case 100 is formed from a combination of metal and plastic components. The cover may include a metal outer shell, such as in the illustrated embodiment, and a plastic sliding insert while the bottom is provided by a metal shell with a plastic (e.g. vacuum formed plastic) insert that includes cavities shaped to securely hold the different components of the e-cigarette. Other embodiments may have the cover and the bottom formed entirely of plastic for ease of manufacture.

Figure 2:
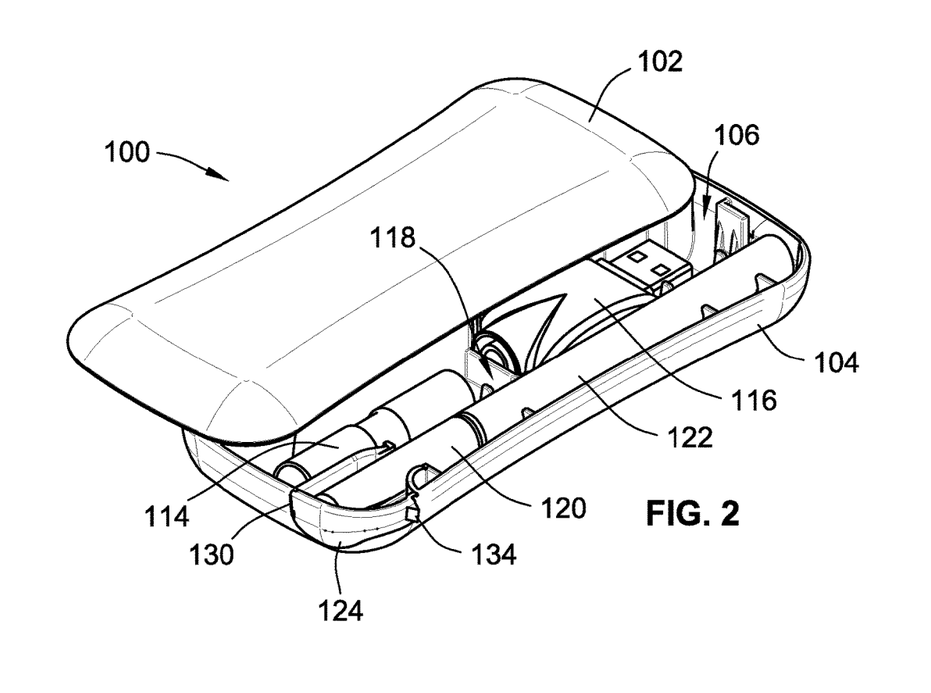
FIG. 2 is a top perspective view of the carrying case of FIG. 1 with the cover slid to an open state.
Figure 3:
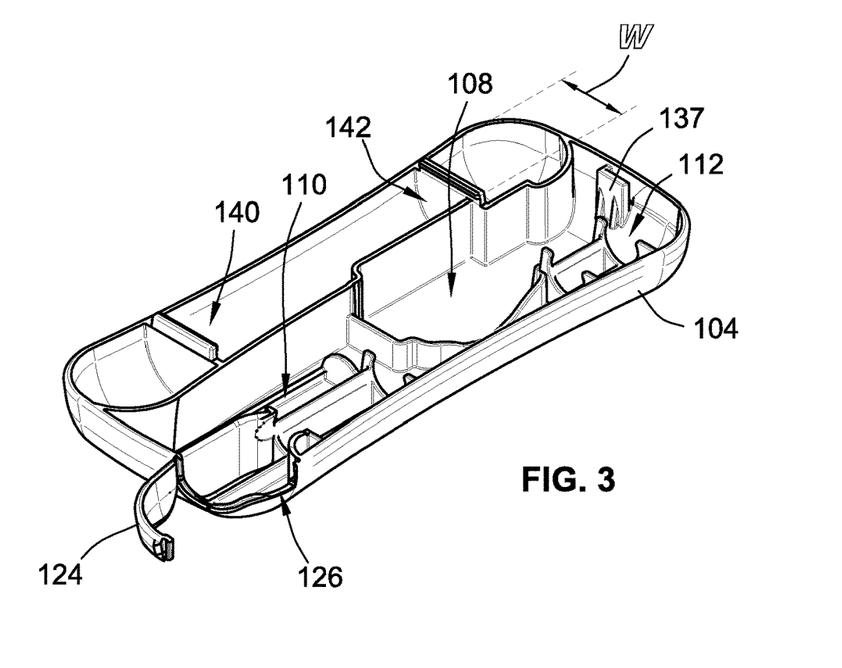
FIG. 3 is a top perspective view of the carrying case of FIG. 1 with the cover removed and a door thereof in an open state.

With reference to FIGS. 2 and 3 one embodiment of a bottom 104 that is formed from plastic material is illustrated. The bottom 104 includes a plurality of cavities 108, 110, 112 formed therein. Cavity 110 is sized and shaped to hold a spare cartomizer 114. Cavity 108 is sized and shaped to hold a charger 116, and particularly a USB charger. Cavity 112 is sized and shaped to hold a fully assembled e-cigarette 118 having cartomizer 120 attached to battery tube 122. The size and shape of cavities 108, 110, 112 are such that the corresponding components held therein are either snap or press fit such that when the carrying case 100 is closed the components are maintained in a generally organized arrangement.

The carrying case 100 is designed to allow for access to the e-cigarette 118 when the cover 102 is slid to an open state, such as illustrated in FIG. 2, as well as to provide access by a user who simply wants to vape quickly and then put the e-cigarette away. As such, the carrying case 100 has a second device for accessing the internal cavity 106. In this embodiment, a door 124 provides access to the internal cavity 106. The door 124 closes an opening 126 formed in the sidewall of the bottom 104.

Figure 4:
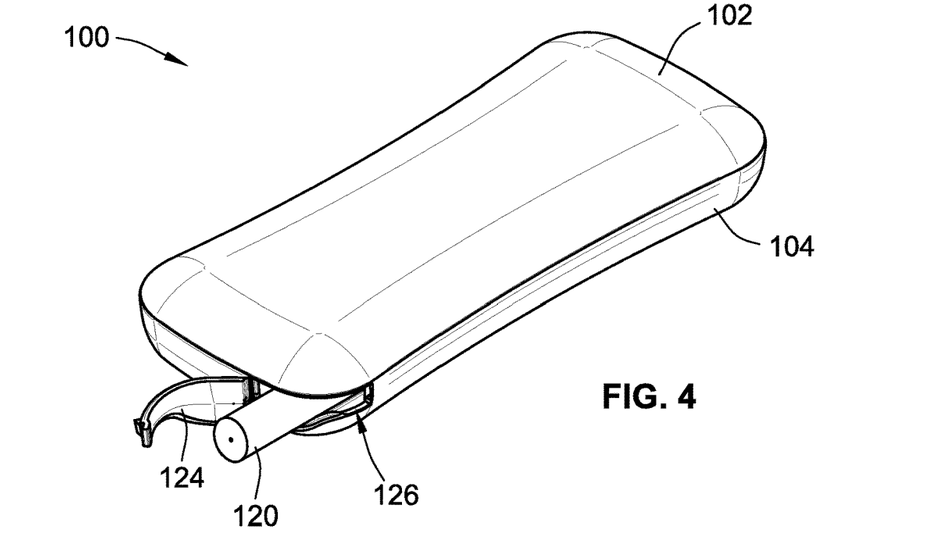
FIG. 4 is a top perspective view of the carrying case of FIG. 1 with the cover in a closed state and the door in an open state providing access to an e-cigarette while the super majority remains within the carrying case.
Figure 5:
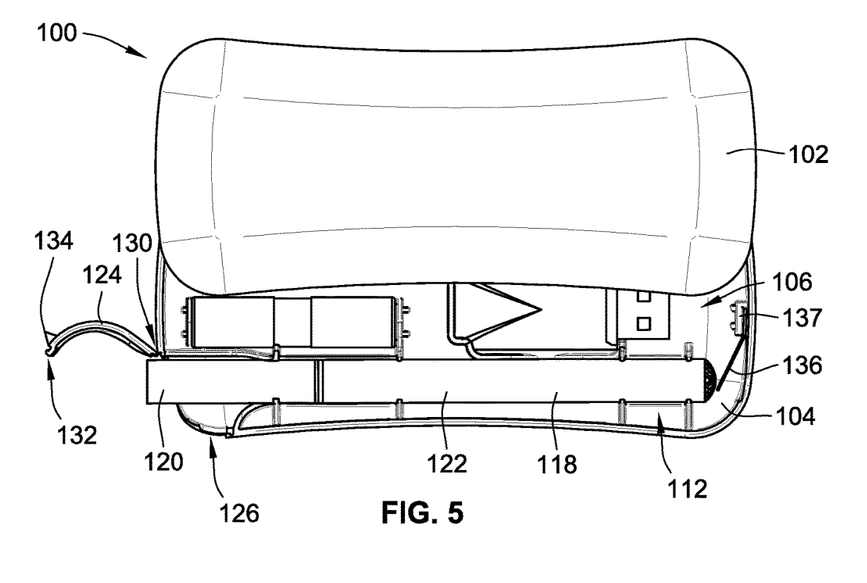
FIG. 5 is a top view of the carrying case of FIG. 1 with the cover and door in open states.

With additional reference to FIGS. 4 and 5, opening of door 124 to an open state provides access to the cavity 112 that holds the assembled e-cigarette 118 and particularly the cartomizer 120 thereof such that a user can vape without having to remove the entire assembled e-cigarette 118 from the carrying case 100.

As such, the carrying case 100 provides at least two access openings for accessing at least one of the contents held therein. The primary access opening is the opening that is formed when the cover 102 is slid to an open state relative to the bottom 104 such as illustrated in FIG. 2. The secondary access opening is the opening 126 that is accessed by moving door 124 to an open state relative to bottom 104.

The primary access opening can generally be viewed to have a much larger dimension than access opening 126. In some embodiments, the secondary access opening is dimensioned similar to and slightly larger than the dimensions of the e-cigarette or at least the cartomizer 120 that is mouthed by the user during vaping.

The primary access opening, at least in this embodiment, is dimensioned larger than the maximum dimension of the assembled e-cigarette 118 while the secondary access opening 126 is dimensioned smaller than the primary access opening and only allows for the assembled e-cigarette to pass therethrough in an axial direction, i.e. in a direction that is along the longitudinal axis of the assembled e-cigarette.

The door 124 is preferably hingedly affixed to the bottom 104 at hinge 130. Hinge 130 could be a living hinge formed from a thin plastic web or could be formed from other means such as a hinge pin or other arrangement. Further, door 124 could be slidably carried on bottom 124 between open and closed states and need not be hingedly affixed (see e.g. embodiment below).

Door 124 includes a latch 132 to secure the door 124 in a closed state relative to bottom 104 as well as a gripping projection 134 that can be gripped by the user to facilitate opening of the door 124.

With reference to FIG. 5, to facilitate transitioning the e-cigarette to a useable state when using door 124 and opening 126, the carrying case 100 could include a biasing mechanism in the form of spring tab 136 that axially biases the assembled e-cigarette 118 out of cavity 112 through opening 126. This allows the user to grip the cartomizer 120 with the user's fingers or lips for further use. The bottom 104 includes a spring tab holder 137 that defines a slot in which one end of the spring tab 136 sits to secure the spring tab 136 to bottom 104.

This opening 126 allows for quick removal and re-insertion of the object without opening the cover 102. This also may allow for one hand operation/access to the contents within the internal cavity of the carrying case. More particularly, the user may be able to hold the carrying case 100 with their hand and activate the door 124 with a finger, most likely the thumb, and provide access through opening 126. However, because cover 102 is not opened, other contents within the carrying case 100 are not at risk of spilling or falling out of the carrying case 100.

Figure 6:
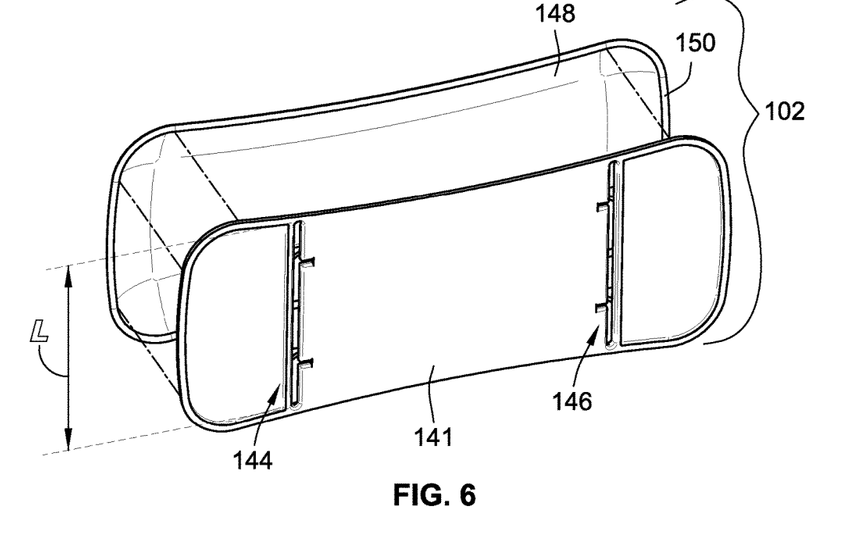
FIG. 6 is a bottom exploded illustration of the cover of the carrying case of FIG. 1.
Figure 7:
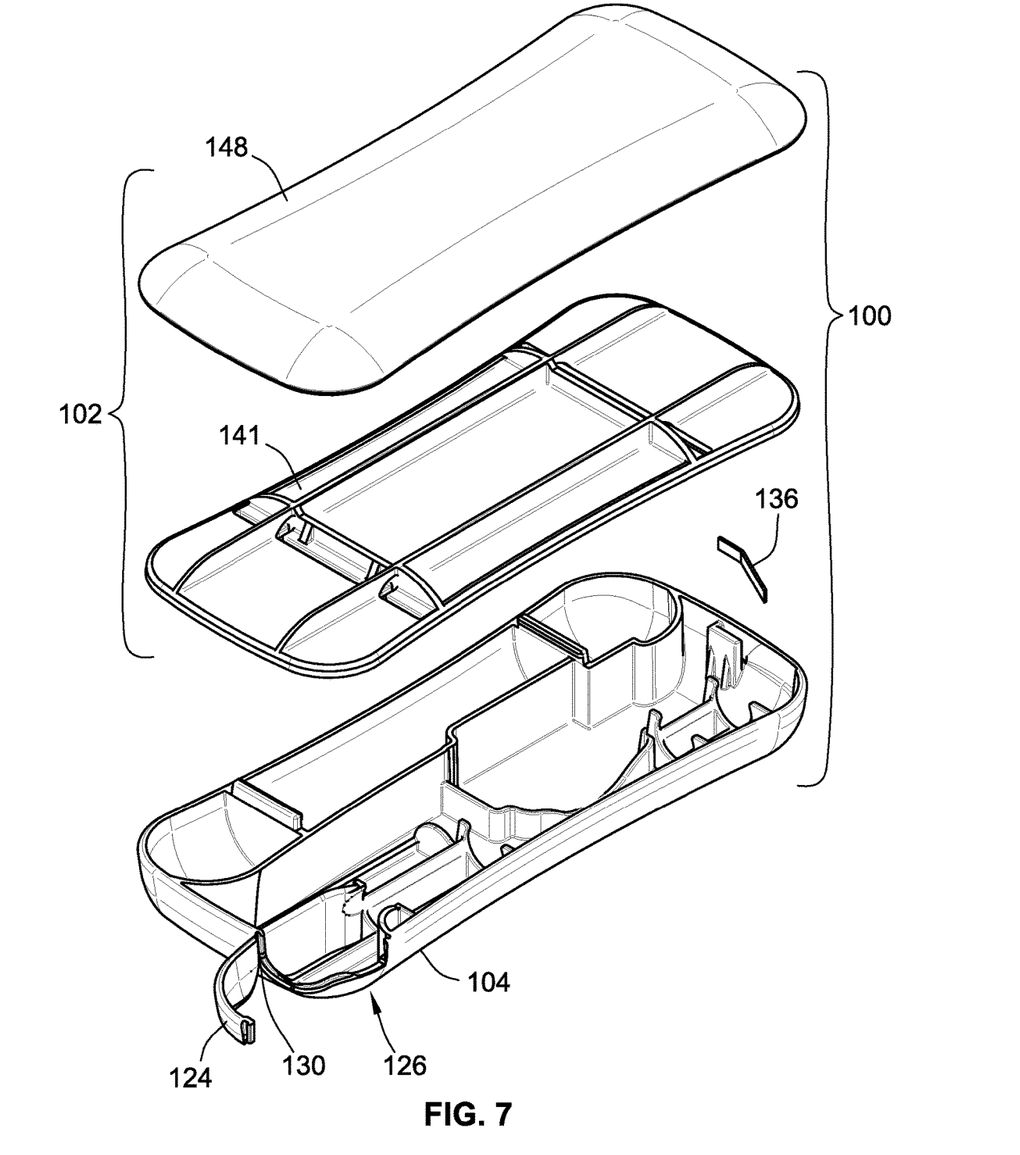
FIG. 7 is a top exploded illustration of the carrying case of FIG. 1.
Figure 8:
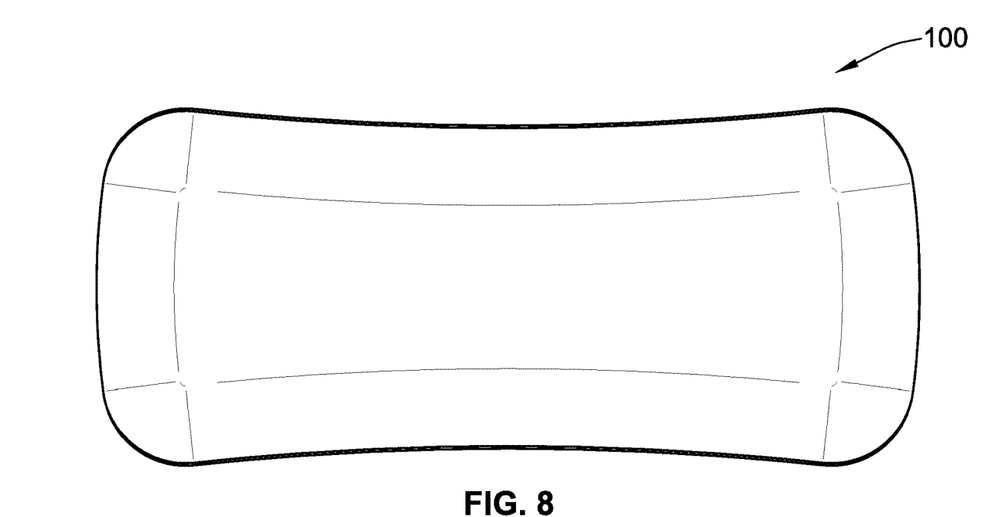
FIGS. 8-13 are top, left, front, right, bottom and rear views of the carrying case of FIG. 1.
Figure 9:
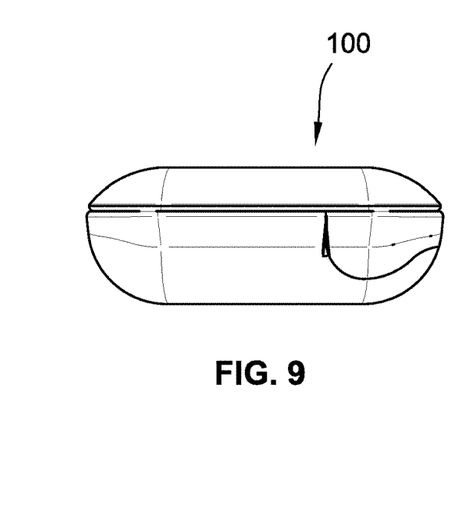
Figure 10:
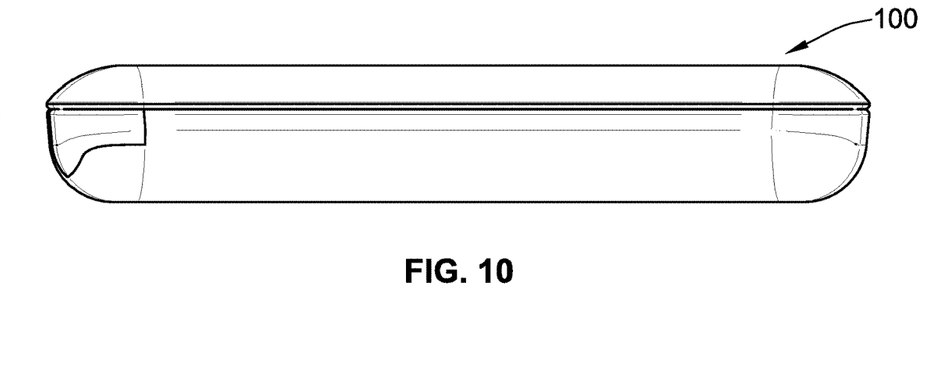
Figure 11:
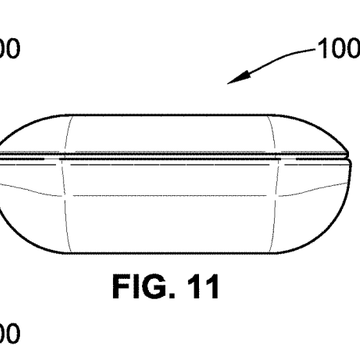
Figures 12, 13:
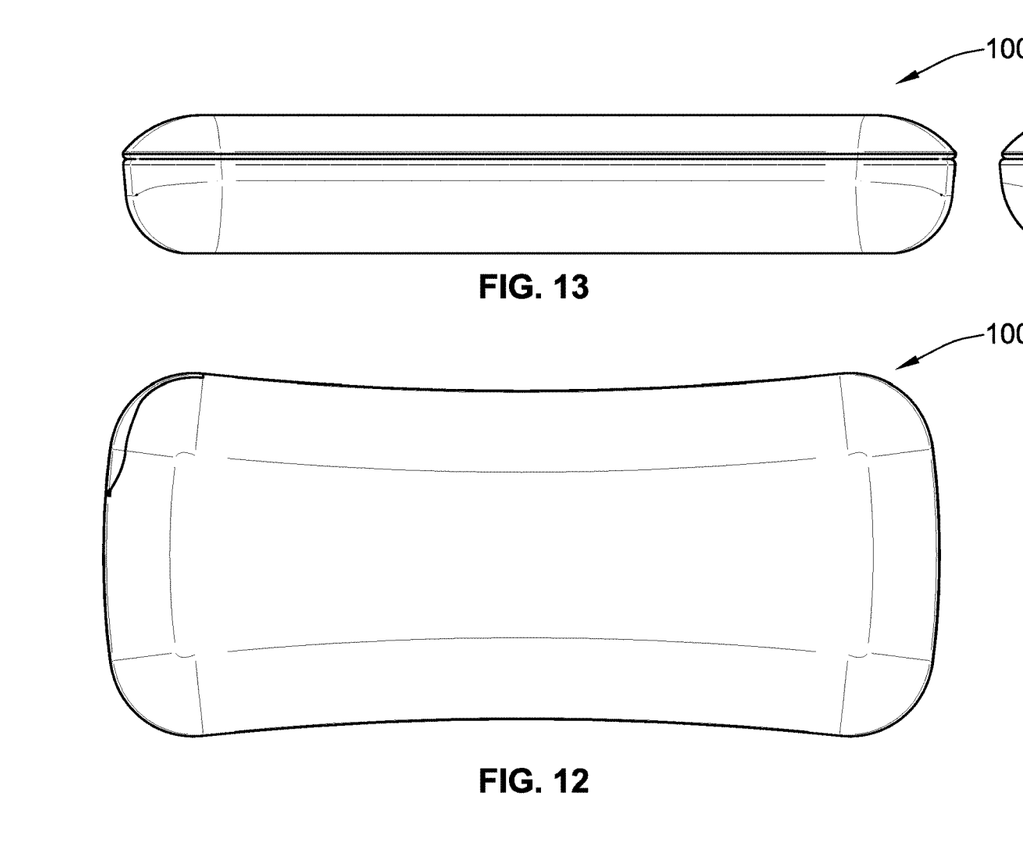

With reference to FIGS. 3 and 6, the bottom 104 includes catches 140, 142 to slidably attach the cover 102 to the bottom 104. The cover 102 includes an attachment insert 141 that includes slots 144, 146 that receive catches 140, 142 therethrough. The catches 140, 142 have inward extending projections or undercuts that overlap with a portion of the attachment insert 141 that defines slots 144, 146. This arrangement secures the attachment insert 141 to the bottom 104 thereby securing the cover 102 to bottom 104. The length L of the slots 144, 146 is greater than the width W of the catches 140, 142 to allow for the sliding action of the cover 102 relative to the bottom 104 to transition the cover 102 between open and closed states.

The attachment insert 141 snap engages with shell 148 to secure the two components together. In one embodiment, the attachment insert 141 is formed from molded plastic such that the more complex structures for attaching the cover 102 to the bottom 104 can be more easily formed. The shell 148 may be formed of sheet metal and have an inward directed curl or partial fold 150 that provides an undercut to secure the two components.

Figure 14:
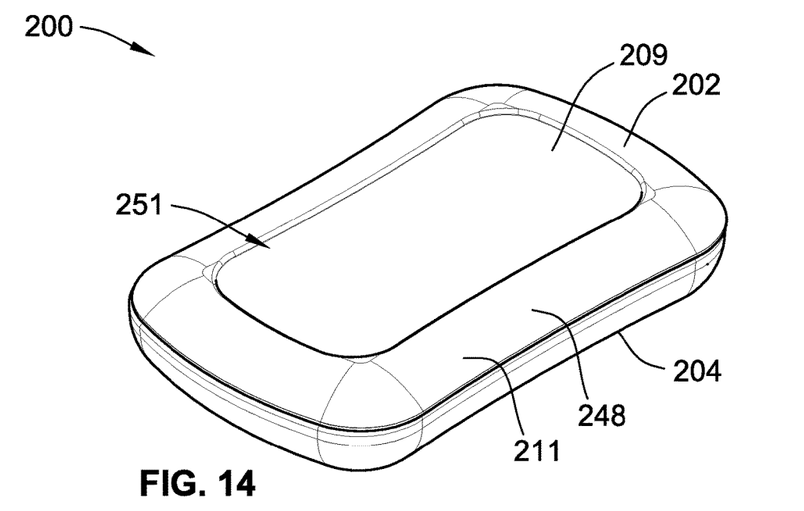
FIG. 14 is a top. perspective illustration of a second embodiment of a carrying case.

FIG. 14 illustrates a second embodiment of a carrying case 200 according to the invention. This embodiment is similar to carrying case 100 in that cover 202 is slidably connected to bottom 204.

Figure 15:
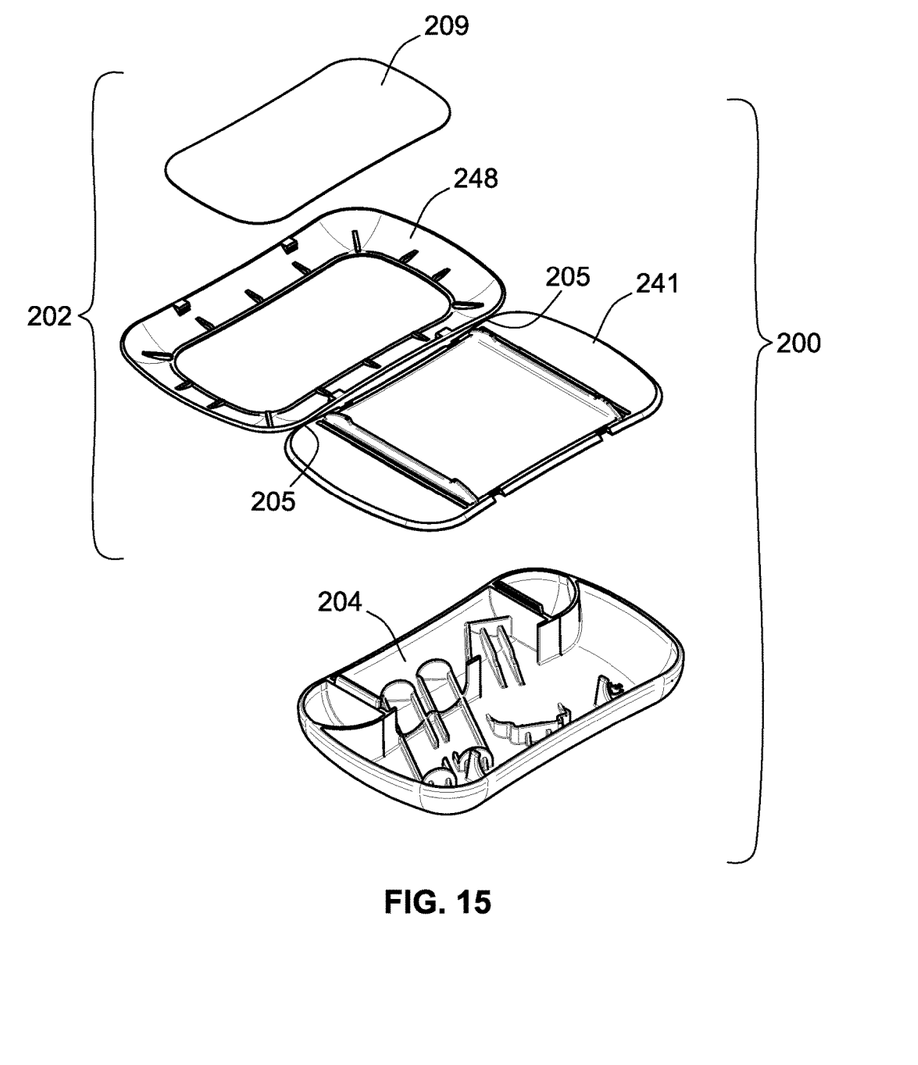
FIG. 15 is a top exploded illustration of the carrying case of FIG. 14.
Figure 16:
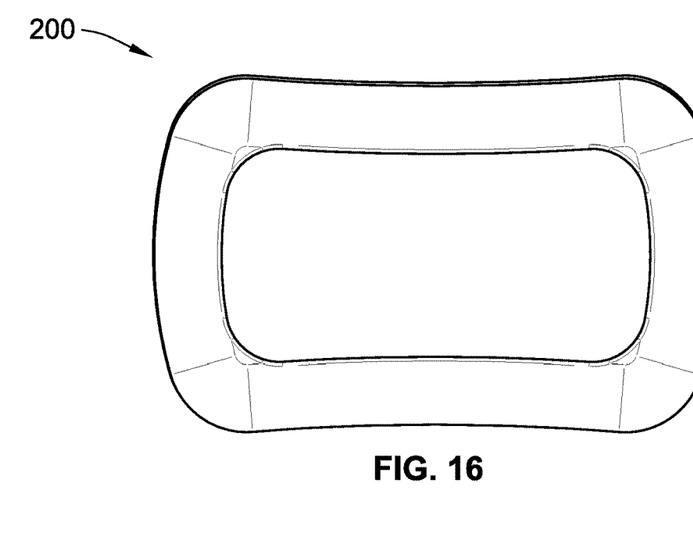
FIGS. 16-21 are top, left, front, right, bottom and rear views of the carrying case of FIG. 14.
Figure 17:
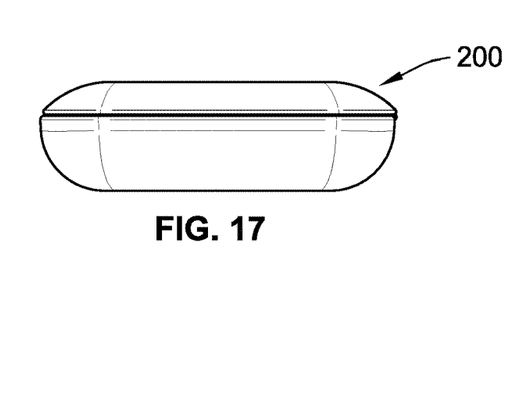
Figure 18:
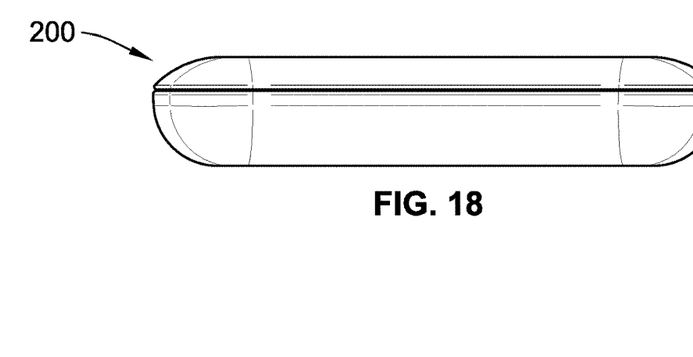
Figure 19:
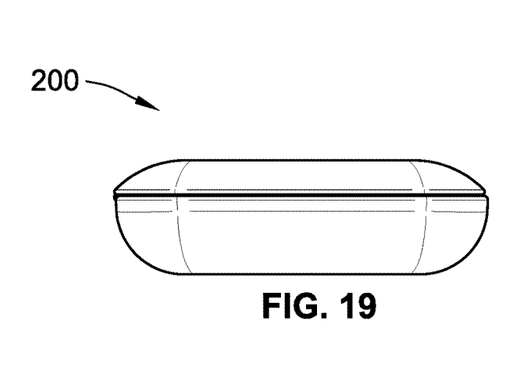
Figure 20:
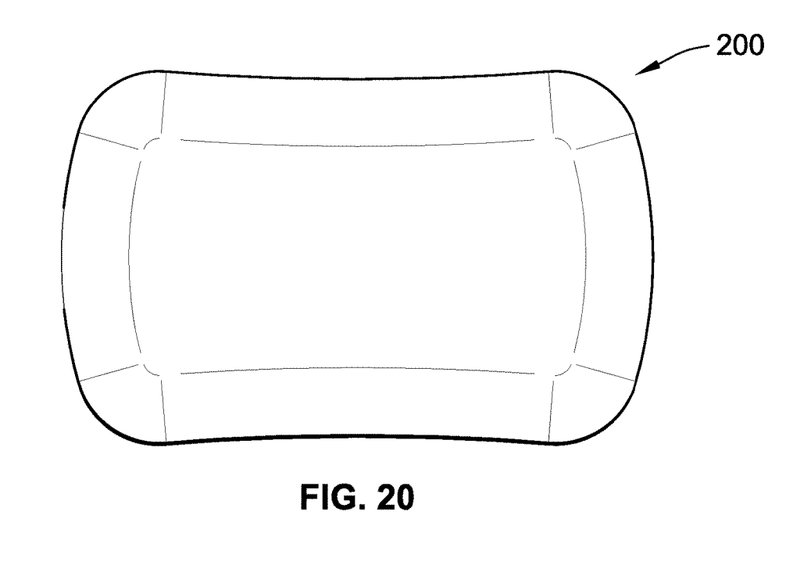
Figure 21:
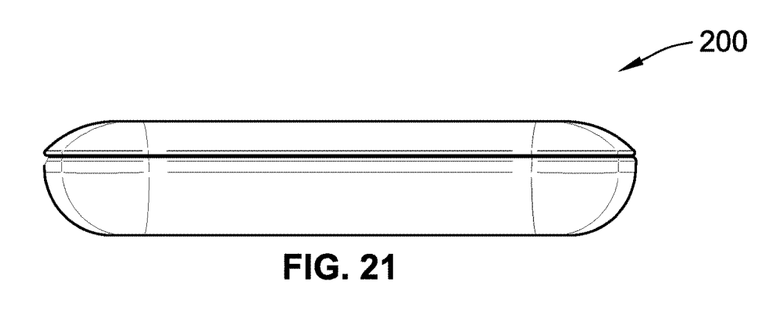
Figure 22:
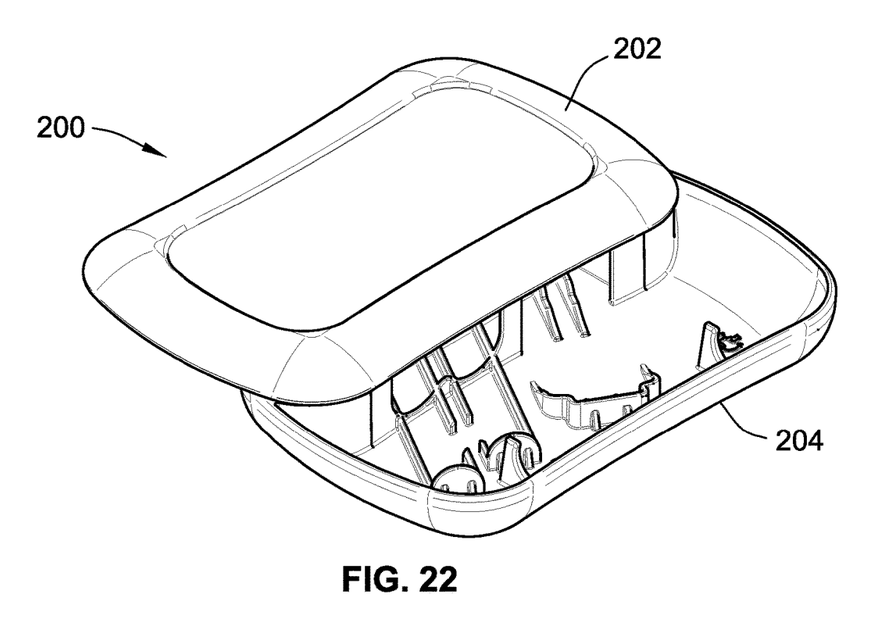
FIG. 22 is a top perspective illustration of the carrying case of FIG. 14 in an open state.

In this embodiment, the cover 202 includes an attachment portion 241 and a shell portion 248. In this embodiment, both the attachment portion 241 and shell portion 248 are formed from molded plastic. Further, they are formed as a one-piece molded component. The two components are operably connected together by hinge 205. As such, after being molded in the state as illustrated in FIG. 15, the shell portion 248 is folded onto attachment portion 241.

The embodiment uses slots and catches just like the prior embodiment for slidably securing the cover 202 to the bottom 204.

With reference to FIG. 14, the cover 202 includes a decorative plate 209 that is attached to an outer surface 211 of the shell portion 248. In the illustrated embodiment, the decorative plate 209 is located in a recess 251 formed in outer surface 211. The decorative plate may be plastic, a paper sticker, a metal insert or other material for decoration or providing information.

While carrying case 200 is not illustrated with a door, a door similar to door 124 discussed above could be added to the carrying case to provide secondary access to the storage compartment of the carrying case 200.

Figure 23:
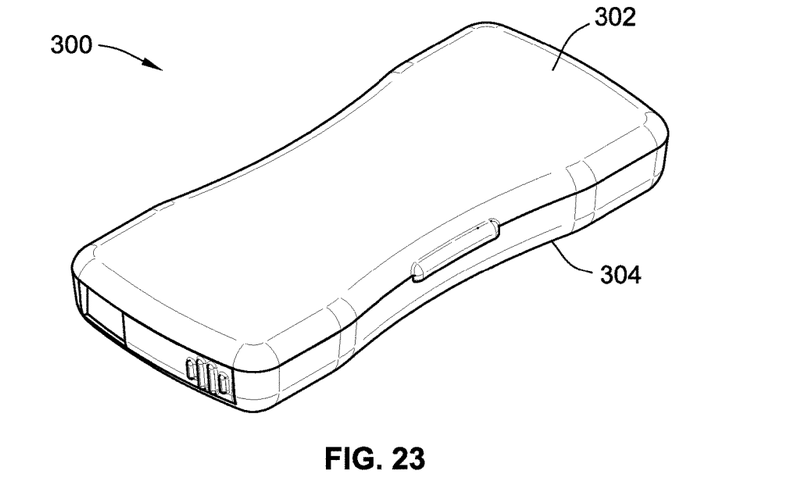
FIG. 23 is a top. perspective illustration of a third embodiment of a carrying case.
Figure 24:
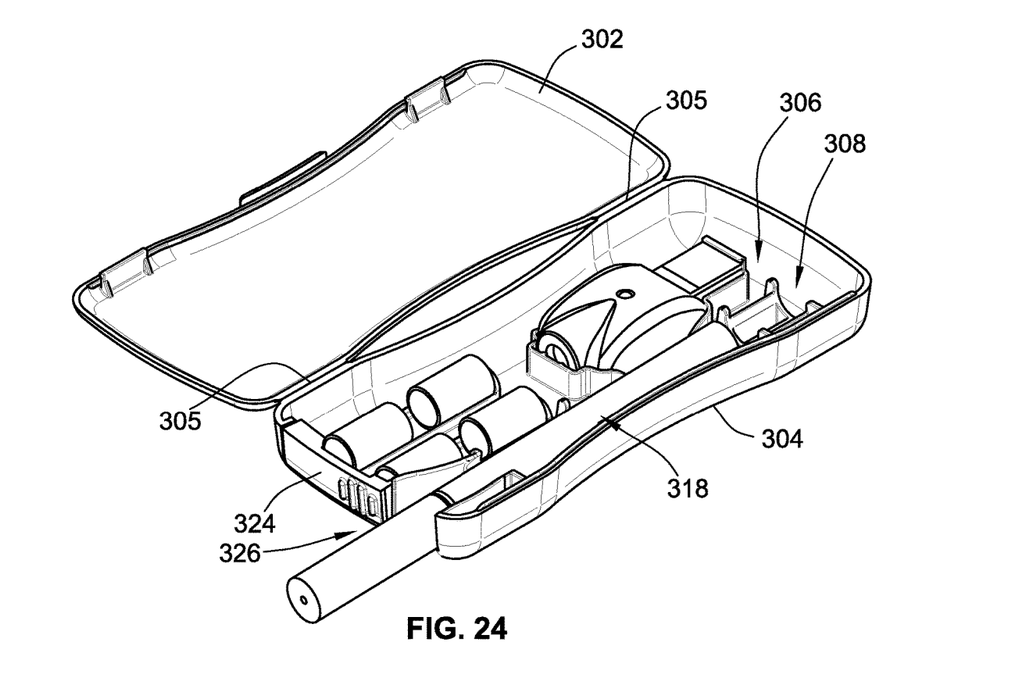
FIG. 24 is a top perspective illustration of the carrying case of FIG. 23 in an open state.
Figure 25:
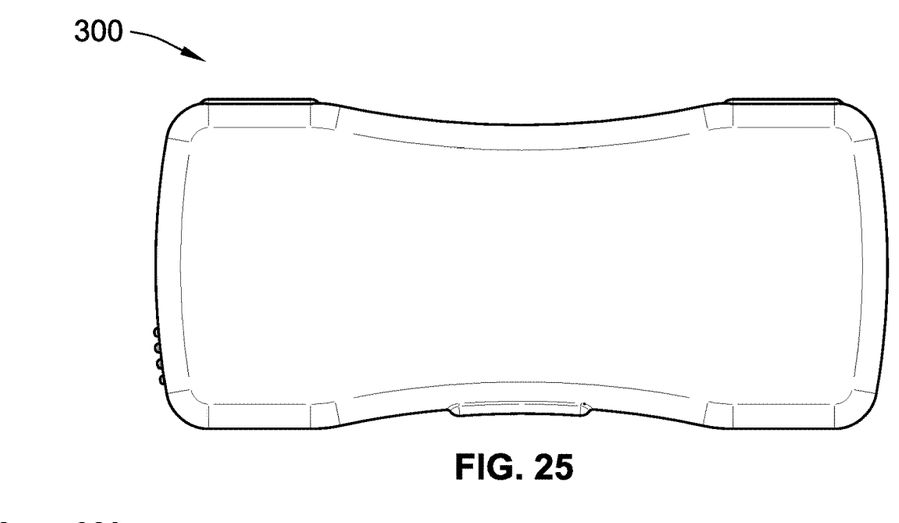
FIGS. 25-30 are top, left, front, right, bottom, and rear views of the carrying case of FIG. 23.
Figure 26:
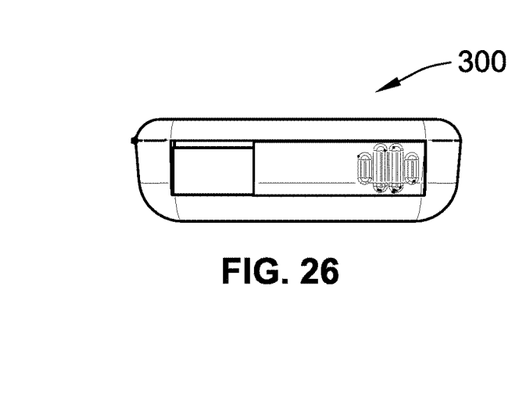
Figure 27:
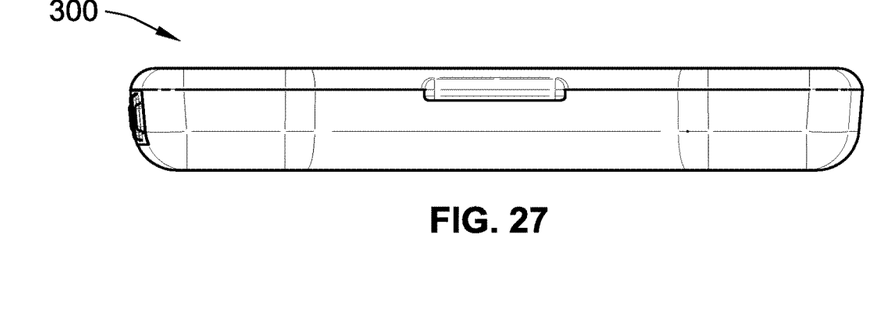
Figure 28:
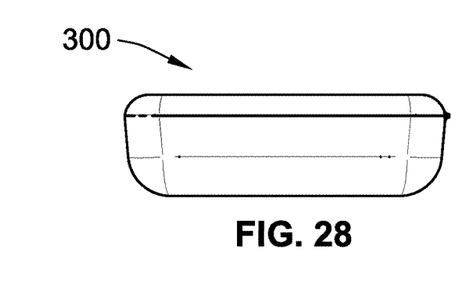
Figure 29:
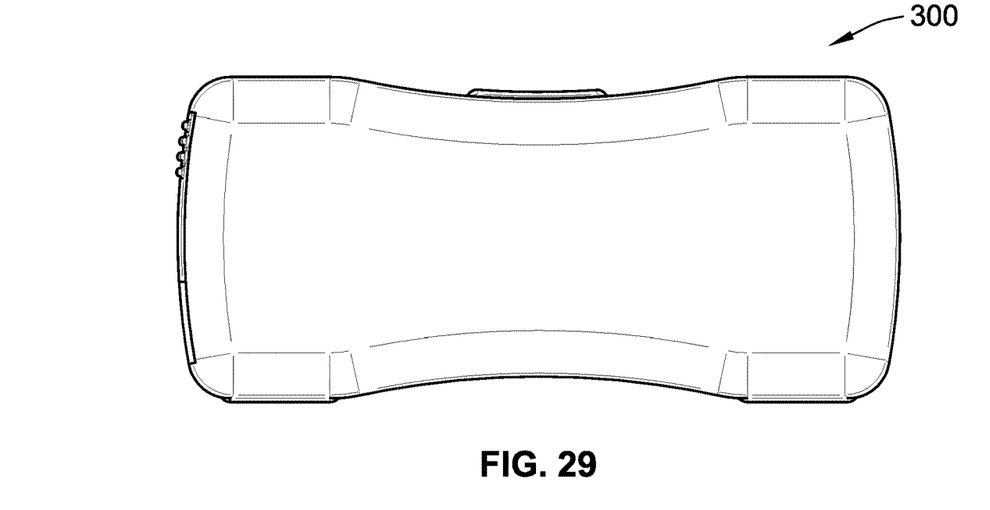
Figure 30:
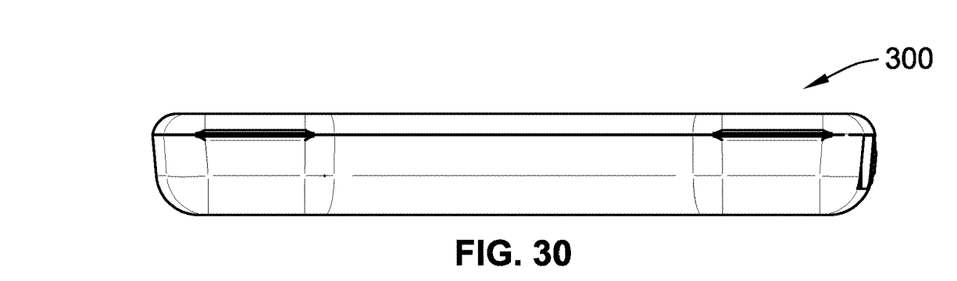

FIG. 23 illustrates a further embodiment of a carrying case 300 according to the teachings of the present invention. The carrying case 300 includes a cover 302 hingedly attached to a bottom 304 with hinges 305. The cover 302 can be transitioned to an open position as illustrated in FIG. 24 to provide access to the internal cavity 306 by pivoting the cover 302 relative to the bottom 304.

In this embodiment, the cover 302 and bottom 304 can be formed from a single one piece construction as the hinges may be living hinges. Alternatively, the hinges 305 could be mechanical hinges that use pins or pivot structures for allowing the cover 302 to pivot relative to bottom 304.

The carrying case 300 also includes a door 324 that provides access to internal cavity 306 through opening 326. In this embodiment, door 324 is slidably carried for transitioning between closed (FIG. 23) and open (FIG. 24) states. Opening 326 communicates with a cavity 308 sized and configured to hold an assembled e-cigarette similar to the first embodiment.

The door 324 and opening 326 allows a user access to one or more of the objects stored in the carrying case 300 without having to open cover 302 like carrying case 100. A biasing mechanism, not shown in this embodiment, could be employed to bias the object, e.g. e-cigarette 318 through opening 326 when door 324 is slid to an open position.

Again, the dimensions of opening 326 are smaller than the dimensions of the opening provided by moving cover 302 to an open state.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A carrying case comprising:
   a bottom having an internal cavity in which an elongated object can be housed, the bottom defining a first opening through which the elongated object may be removed from the internal cavity, the first opening having a first dimension that is greater than a largest dimension of the elongated object and a second opening having a second dimension that is greater than a smaller dimension of the elongated object, the smaller dimension of the elongated object is smaller than the largest dimension of the elongated object, the second dimension being smaller than the first dimension;
   a cover movably connected to the bottom to be moved between an open state in which removal of the elongated object through the first opening is provided and a closed state preventing removal of the elongated object;
   a door movably connected to the bottom to be moved between an open state in which removal of the elongated object through the second opening is provided and a closed state preventing removal of the elongated object;

wherein the cover is slidably connected to the bottom; and wherein the cover includes an outer shell connected to an attachment insert.

2. The carrying case of claim 1, further comprising means for connecting the attachment insert to the bottom and to permit sliding action between the attachment insert and the bottom.

3. A carrying case comprising:

a bottom having an internal cavity in which an elongated object can be housed, the bottom defining a first opening through which the elongated object may be removed from the internal cavity, the first opening having a first dimension that is greater than a largest dimension of the elongated object and a second opening having a second dimension that is greater than a smaller dimension of the elongated object, the smaller dimension of the elongated object is smaller than the largest dimension of the elongated object, the second dimension being smaller than the first dimension;

a cover movable connected to the bottom to be proved between an open state in winch removal of the elongated object through the first opening is provided and a closed state preventing removal of the elongated object, a door movable connected to the bottom to be moved between an open state in which removal of the elongated object through the second opening is provided and a closed state preventing removal of the elongated object;

wherein the cover is slidably connected to the bottom; and wherein the cover includes an attachment portion and a shell portion, the shell portion is operably connected to the attachment portion and the attachment portion slidably connects the cover to the bottom.

4. A kit comprising:

an elongated object; and a carrying case including:

a bottom having an internal cavity in which the elongated object is housed, the bottom defining a first opening through which the elongated object may be removed from the internal cavity, the first opening having a first dimension that is greater than a largest dimension of the elongated object and a second opening having a second dimension that is greater than a smaller dimension of the elongated object, the smaller dimension of the elongated object is smaller than the largest dimension of the elongated object, the second dimension being smaller than the first dimension;

a cover movably connected to the bottom to be moved between an open state in which removal of the elongated object through the first opening is provided and a closed state preventing removal of the elongated object;

a door movably connected to the bottom to be moved between an open state in which removal of the elongated object through the second opening is provided and a closed state preventing removal of the elongated a biasing structure positioned to bias an object through the second opening when the door is in the open state;

wherein the cover is slidably connected to the bottom; and wherein the cover includes an attachment portion and a shell portion, the shell portion is operably connected to the attachment portion and the attachment portion slidably connects the cover to the bottom.

5. The kit of claim 4, wherein the elongated object is an e-cigarette.

6. The kit of claim 4, wherein:

the cover is movable between the closed state and open state thereof when the door is in the closed state and when the door is in the open state; and the door is movable between the closed state and open state thereof when the cover is in the closed state and when the cover is in the open state.

* * * * *

UNITED STATES PATENT AND TRADEMARK OFFICE
CERTIFICATE OF CORRECTION

PATENT NO. : 10,279,983 B2
APPLICATION NO. : 15/240782
DATED : May 7, 2019
INVENTOR(S) : Jason W. Ludewig et al.

Page 1 of 1

It is certified that error appears in the above-identified patent and that said Letters Patent is hereby corrected as shown below:

In the Claims

Column 7, Claim 3, Line 23: delete "moveable" and replace with --moveably--

Column 7, Claim 3, Line 23: delete "proved" and replace with --moved--

Column 7, Claim 3, Line 24: delete "winch" and replace with --which--

Signed and Sealed this
Tenth Day of September, 2019

Andrei Iancu
*Director of the United States Patent and Trademark Office*